US011403510B2

(12) United States Patent
Mathur et al.

(10) Patent No.: US 11,403,510 B2
(45) Date of Patent: Aug. 2, 2022

(54) PROCESSING SENSOR DATA

(71) Applicant: Nokia Technologies Oy, Espoo (FI)

(72) Inventors: Akhil Mathur, Cambridge (GB); Anton Isopoussu, Cambridge (GB); Nicholas Lane, Cambridge (GB); Fahim Kawsar, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 251 days.

(21) Appl. No.: 16/513,212

(22) Filed: Jul. 16, 2019

(65) Prior Publication Data

US 2020/0027442 A1 Jan. 23, 2020

Related U.S. Application Data

(60) Provisional application No. 62/700,850, filed on Jul. 19, 2018.

(51) Int. Cl.

| | |
|---|---|
| ***G06N 3/04*** | (2006.01) |
| ***G06N 20/00*** | (2019.01) |
| ***G06N 3/08*** | (2006.01) |
| ***G10L 15/01*** | (2013.01) |
| ***G10L 15/06*** | (2013.01) |
| ***G10L 15/16*** | (2006.01) |
| ***G10L 15/18*** | (2013.01) |
| ***G10L 15/22*** | (2006.01) |
| ***G10L 21/0216*** | (2013.01) |
| ***G10L 25/30*** | (2013.01) |

(52) U.S. Cl.

CPC ............ *G06N 3/0454* (2013.01); *G06N 3/08* (2013.01); *G06N 20/00* (2019.01); *G10L 15/01* (2013.01); *G10L 15/063* (2013.01); *G10L 15/16* (2013.01); *G10L 15/18* (2013.01); *G10L 25/30* (2013.01); *G10L 2015/226* (2013.01); *G10L 2021/02165* (2013.01)

(58) Field of Classification Search

CPC ........ G06N 3/0454; G06N 20/00; G06N 3/04; G06N 3/02; G10L 25/30; G10L 15/16

See application file for complete search history.

(56) References Cited

U.S. PATENT DOCUMENTS 5,844,994 A 12/1998 Graumann
7,688,985 B2 3/2010 Roeck
(Continued)

FOREIGN PATENT DOCUMENTS

CN 103438985 A 12/2013
CN 107610195 A 1/2018

OTHER PUBLICATIONS

Oord et al., "Conditional Image Generation with PixelCNN Decoders", Proceedings of the 30th International Conference on Neural Information Processing Systems, Dec. 5-10, 2016, pp. 1-9.
(Continued)

*Primary Examiner* — Samuel G Neway
(74) *Attorney, Agent, or Firm* — Alston & Bird LLP

(57) ABSTRACT

An apparatus comprising means for: using a generative neural network, trained to translate first sensor data to simulated second sensor data, to translate input first sensor data from a first sensor to simulated second sensor data; and providing the simulated second sensor data to a different, specific-task, machine-learning model for processing at least second sensor data.

19 Claims, 7 Drawing Sheets

(56) References Cited

U.S. PATENT DOCUMENTS

| | | | | |
|---|---|---|---|---|
| 9,173,046 | B2 | 10/2015 | Frey et al. | |
| 9,888,316 | B2 | 2/2018 | Matheja et al. | |
| 10,068,557 | B1 * | 9/2018 | Engel | G06N 3/04 |
| 10,971,142 | B2 * | 4/2021 | Sriram | G10L 15/063 |
| 2016/0073210 | A1 | 3/2016 | Sheen | |
| 2018/0218497 | A1 * | 8/2018 | Golden | G06T 7/11 |
| 2018/0233127 | A1 * | 8/2018 | Visser | G10L 15/26 |
| 2018/0247201 | A1 * | 8/2018 | Liu | G06N 3/088 |
| 2018/0342256 | A1 * | 11/2018 | Huffman | G10L 15/22 |
| 2020/0027442 | A1 * | 1/2020 | Mathur | G06N 3/0454 |

OTHER PUBLICATIONS

Zhu et al., “Unpaired Image-to-Image Translation using Cycle-Consistent Adversarial Networks”, The IEEE International Conference on Computer Vision (ICCV), Oct. 22-29, 2017, pp. 2242-2251.
Fang et al., “High-Quality Nonparallel Voice Conversion Based on Cycle-Consistent Adversarial Network”, IEEE International Conference on Acoustics, Speech and Signal Processing , Apr. 15-20, 2018, 5 pages.
Donahue et al., “Adversarial Audio Synthesis”, International Conference on Learning Representations, Feb. 9, 2019, pp. 1-16.
Isola et al., “Image-to-Image Translation with Conditional Adversarial Networks”, IEEE Conference on Computer Vision and Pattern Recognition (CVPR), Jul. 21-26, 2017, pp. 1125-1134.
Oord et al., “WaveNet: A Generative Model for Raw Audio”, arXiv, Sep. 19, 2016, pp. 1-15.
Engel et al., “Neural Audio Synthesis of Musical Notes with WaveNet Autoencoders”, arXiv, Apr. 5, 2017, 16 pages.
“Launching the Speech Commands Dataset”, Google AI Blog, Retrieved on Jul. 17, 2019, Webpage available at : https://ai.googleblog.com/2017/08/launching-speech-commands-dataset.html.
“TensorFlow Speech Recognition Challenge”, Kaggle, Retrieved on Jul. 18, 2019, Webpage available at : https://www.kaggle.com/c/tensorflow-speech-recognition-challenge.
“Alexa Voice Service Overview (v20160207)”, Amazon Alexa, Retrieved on Jul. 17, 2019, Webpage available at : https://developer.amazon.com/docs/alexa-voice-service/api-overview.html.
“Siri for Developers”, Apple, Retrieved on Jul. 17, 2019, Webpage available at: https://developer.apple.com/siri/.
“Build DIY Amazon Alexa With a MATRIX Creator on “Hands-free” Mode”, Instructables, Retrieved on Jul. 17, 2019, Webpage available at : https://www.instructables.com/id/Build-DIY-Amazon-Alexa-With-a-MATRIX-Creator-on-Ha/.
“Cloud Speech-to-Text”, Google Cloud, Retrieved on Jul. 17, 2019, Webpage available at : https://cloud.google.com/speech-to-text/.
Amft, “On The Need for Quality Standards in Activity Recognition using Ubiquitous Sensors”, How To Do Good Research In Activity Recognition. Workshop in conjunction with Pervasive, 2010, 4 pages.
Amft et al., “Analysis of Chewing Sounds for Dietary Monitoring”, International Conference on Ubiquitous Computing, Sep. 11-14, 2005, pp. 1-16.
Amft et al., “Methods for Detection and Classification of Normal Swallowing From Muscle Activation and Sound”, Pervasive Health Conference and Workshops, Nov. 29-Dec. 1, 2006, 10 pages.
Anagnostopoulos et al., “Features and Classifiers for Emotion Recognition from Speech: A Survey from 2000 To 2011”, Artificial Intelligence Review, vol. 43, No. 2, Feb. 2015, 23 pages.
Chen et al., “Small-Footprint Keyword Spotting using Deep Neural Networks”, IEEE International Conference on Acoustics, Speech and Signal Processing (ICASSP), May 4-9, 2014, pp. 4087-4091.
Choi et al., “StarGAN: Unified Generative Adversarial Networks for Multi-Domain Image-to-Image Translation”, Arxiv, 2017, pp. 1-15.
Das et al., “Fingerprinting Smart Devices Through Embedded Acoustic Components”,arXiv, 2014, pp. 1-18.
Donahue et al., “Synthesizing Audio with Generative Adversarial Networks”, arXiv, 2018, 11 pages.
Ephraim et al., “Speech Enhancement Using a Minimum-mean Square Error Short-Time Spectral Amplitude Estimator”, IEEE Transactions on Acoustics, Speech, and Signal Processing, vol. 32, No. 6, Dec. 1984, p. 1109-1121.
Ephraim et al., “A Signal Subspace Approach for Speech Enhancement”, IEEE Transactions on Speech and Audio Processing, vol. 3, No. 4, Jul. 1995, pp. 251-266.
Blunck et al., “On Heterogeneity in Mobile Sensing Applications Aiming at Representative Data Collection”, Proceedings of the ACM conference on Pervasive and ubiquitous computing adjunct publication, Sep. 8-12, 2013, pp. 1087-1098.
Fang et al., “Comparison of Different Implementations of MFCC”, Journal of Computer Science and Technology, vol. 16, No. 6, Sep. 2001, pp. 582-589.
Mathur et al., “Using Deep Data Augmentation Training to Address Software and Hardware Heterogeneities in Wearable and Smartphone Sensing Devices”, Proceedings of the 17th ACM/IEEE International Conference on Information Processing in Sensor Networks, Apr. 11-13, 2018, pp. 200-211.
Rachuri et al., “Emotionsense: A Mobile Phones Based Adaptive Platform for Experimental Social Psychology Research”, Proceedings of the 12th ACM international conference on Ubiquitous computing, Sep. 26-29, 2010, pp. 281-290.
Stisen et al., “Smart Devices are Different: Assessing and Mitigating Mobile Sensing Heterogeneities for Activity Recognition”, Proceedings of the 13th ACM Conference on Embedded Networked Sensor Systems, Nov. 1-4, 2015, pp. 127-140.
Goodfellow et al., “Generative Adversarial Nets”, Advances in Neural Information Processing Systems 27 (NIPS 2014), 2014, pp. 1-9.
He et al., “Deep Residual Learning for Image Recognition”, IEEE Conference on Computer Vision and Pattern Recognition (CVPR), Jun. 27-30, 2016, pp. 770-778.
Kim et al., “Environmental Noise Embeddings for Robust Speech Recognition”, ArXiv, Sep. 29, 2016, 5 pages.
Lane et al., “DeepEar: Robust Smartphone Audio Sensing in Unconstrained Acoustic Environments using Deep Learning”, Proceedings of the ACM International Joint Conference on Pervasive and Ubiquitous Computing, Sep. 7-11, 2015, 283-294.
Lee et al., “Sociophone: Everyday Face-To-Face Interaction Monitoring Platform using Multiphone Sensor Fusion”, Proceeding of the 11th annual international conference on Mobile systems, applications, and services, Jun. 25-28, 2013, pp. 375-388.
Lim et al., “All-Pole Modeling of Degraded Speech”, IEEE Transactions on Acoustics, Speech, and Signal Processing, vol. 26, No. 3, Jun. 1978, pp. 197-210.
Liu et al., “Auto-Painter: Cartoon Image Generation from Sketch by using Conditional Generative Adversarial Networks”, arXiv, May 7, 2017, 12 Pages.
Lu et al., “Stresssense: Detecting Stress in Unconstrained Acoustic Environments using Smartphones”, Proceedings of the ACM Conference on Ubiquitous Computing, Sep. 5-8, 2012, pp. 351-360.
Lu et al., “The Jigsaw Continuous Sensing Engine for Mobile Phone Applications”, Proceedings of the 8th ACM Conference on Embedded Networked Sensor Systems, Nov. 3-5, 2010, pp. 71-84.
Lu et al., “Speech Enhancement based on Deep Denoising Autoencoder”, Interspeech, Aug. 25-29, 2013, pp. 436-440.
Maas et al., “Recurrent Neural Networks for Noise Reduction in Robust ASR”, Interspeech, 2012, 4 pages.
Mao et al., “Least Squares Generative Adversarial Networks”, IEEE International Conference on Computer Vision (ICCV), Oct. 22-29, 2017, pp. 2813-2821.
Michelsanti et al., “Conditional Generative Adversarial Networks for Speech Enhancement and Noise-Robust Speaker Verification”, Interspeech, Aug. 20-24, 2017, pp. 2008-2012.
Mirza et al., “Conditional Generative Adversarial Nets”, arXiv, Nov. 6, 2014, pp. 1-7.
Pascual et al., “SEGAN: Speech Enhancement Generative Adversarial Network”, Arxiv, Jun. 9, 2017, 5 pages.

(56) References Cited

OTHER PUBLICATIONS

Pathak et al., "Context Encoders: Feature Learning by Inpainting", IEEE Conference on Computer Vision and Pattern Recognition (CVPR), Jun. 27-30, 2016, pp. 2536-2544.
Piczak et al., "Environmental Sound Classification with Convolutional Neural Networks", IEEE 25th International Workshop on Machine Learning for Signal Processing (MLSP), Sep. 17-20, 2015, 6 pages.
Qian et al., "Very Deep Convolutional Neural Networks for Noise Robust Speech Recognition", IEEE/ACM Transactions on Audio, Speech, and Language Processing, vol. 24, No. 12, Dec. 2016, pp. 2263-2276.
Rabbi et al., "Passive and in-Situ Assessment of Mental and Physical Well-being using Mobile Sensors", Proceedings of the 13th ACM international conference on Ubiquitous computing, Sep. 17-21, 2011, pp. 385-394.
Radford et al., "Unsupervised Representation Learning with Deep Convolutional Generative Adversarial Networks", arXiv, Jan. 7, 2016, pp. 1-16.
Senior et al., "Improving DNN Speaker Independence with I-Vector Inputs",IEEE International Conference on Acoustic, Speech and Signal Processing (ICASSP), May 4-9, 2014, pp. 225-229.
Simonyan et al., "Very Deep Convolutional Networks for Large-Scale Image Recognition", arXiv, Apr. 10, 2015, pp. 1-14.
Tan et al., ""The Sound of Silence"", Proceedings of the 11th ACM Conference on Embedded Networked Sensor SystemsArticle No. 19, Nov. 11-15, 2013, 14 pages.
Weninger et al., "Speech Enhancement with LSTM Recurrent Neural Networks and Its Application to Noise-Robust ASR", International Conference on Latent Variable Analysis and Signal Separation, 2015, pp. 1-9.
Xu et al., "Crowd++: Unsupervised Speaker Count with Smartphones", Proceedings of the ACM international joint conference on Pervasive and ubiquitous computing, Sep. 8-12, 2013, pp. 43-52.
Xu et al., "An Experimental Study on Speech Enhancement based on Deep Neural Networks", IEEE Signal Processing Letters, vol. 21, No. 1, Jan. 2014, pp. 65-68.
"An Intuitive Introduction to Generative Adversarial Networks (GANs)", Freecodecamp, Retrieved on Jul. 16, 2019, Webpage available at: https://www.freecodecamp.org/news/an-intuitive-introduction-to-generative-adversarial-networks-gans-7a2264a81394/.
Extended European Search Report received for corresponding European Patent Application No. 18184867.2, dated Apr. 23, 2019, 13 pages.
Nguyen et al., "Correcting Differences in Multi-Site Neuroimaging Data using Generative Adversarial Networks", arXiv, Apr. 12, 2018, pp. 1-35.
Donahue et al., "Exploring Speech Enhancement with Generative Adversarial Networks for Robust Speech Recognition", IEEE International Conference on Acoustics, Speech and Signal Processing (ICASSP), Apr. 15, 2018, pp. 5024-5028.
Zhang et al., "Translating and Segmenting Multimodal Medical Volumes with Cycle- and Shape-Consistency Generative Adversarial Network", IEEE/CVF Conference on Computer Vision and Pattern Recognition (CVPR), Jun. 18, 2018, pp. 9242-9251.
Office Action for European Application No. 18184867.2 dated Jun. 8, 2021, 8 pages.
Nguyen et al., "Correcting Differences in Multi-Site Neuroimaging Data using Generative Adversarial Networks", arXiv: Computer Vision and Pattern Recognition, (Apr. 2018), 35 pages.
Donahue et al., "Exploring Speech Enhancement with Generative Adversarial Networks for Robust Speech Recognition", 2018 IEEE International Conference on Acoustics, Speech and Signal Processing (ICASSP), (Apr. 2018), 6 pages.
Zhang et al., "Translating and Segmenting Multimodal Medical Volumes with Cycle- and Shape-Consistency Generative Adversarial Network", 2018 IEEE/CVF Conference on Computer Vision and Pattern Recognition, (Jun. 2018), 9 pages.
Extended European Search Report for European Application No. 18184867.2 dated Apr. 23, 2019, 13 pages.

* cited by examiner

PROCESSING SENSOR DATA

TECHNOLOGICAL FIELD

Embodiments of the present disclosure relate to an apparatus comprising means for processing sensor data.

BACKGROUND

A sensor's performance is characterized by a number of parameters such as frequency response, impedance rating, output level, and even the signal processing applied on the samples. All these parameters contribute to the transfer function of a sensor and affect how an input at the sensor is converted to an output by the sensor. Different sensors have different transfer functions owing to the variations in their underlying hardware and even software processing pipelines. A process suitable for processing data from a first sensor cannot therefore necessarily be used for processing data from a second, different sensor.

BRIEF SUMMARY

According to various, but not necessarily all, embodiments there is provided an apparatus comprising means for: using a generative neural network, trained to translate first sensor data to simulated second sensor data, to translate input first sensor data from a first sensor to simulated second sensor data; and providing the simulated second sensor data to a different, specific-task, machine-learning model for processing at least second sensor data.

According to various, but not necessarily all, embodiments there is provided a method of processing sensor data comprising:

using a generative neural network trained to translate first sensor data to simulated second sensor data, to translate input first sensor data from a first sensor to simulated second sensor data;

providing the simulated second sensor data to a different, specific-task, machine-learning model for processing at least second sensor data.

According to various, but not necessarily all, embodiments there is provided an apparatus comprising:

at least one processor; and at least one memory including computer program code, the at least one memory and the computer program code configured to, with the at least one processor, cause the apparatus at least to perform:

use a generative neural network trained to translate first sensor data to simulated second sensor data, to translate input first sensor data from a first sensor to simulated second sensor data;

provide the simulated second sensor data to a different, specific-task, machine-learning model for processing at least second sensor data.

According to various, but not necessarily all, embodiments there is provided an apparatus comprising first circuitry configured to use a generative neural network trained to translate first sensor data to simulated second sensor data, to translate input first sensor data from a first sensor to simulated second sensor data; and a second circuitry configured to receive the simulated second sensor data and to run a different, specific-task, machine-learning model for processing at least second sensor data.

According to various, but not necessarily all, embodiments there is provided a computer program that, when run on a computer, performs:

using a generative neural network trained to translate first sensor data to simulated second sensor data, to translate input first sensor data from a first sensor to simulated second sensor data;

providing the simulated second sensor data to a different, specific-task, machine-learning model for processing at least second sensor data.

According to various, but not necessarily all, embodiments there is provided a computer program that causes an apparatus to perform:

using a generative neural network trained to translate first sensor data to simulated second sensor data, to translate input first sensor data from a first sensor to simulated second sensor data;

providing the simulated second sensor data to a different, specific-task, machine-learning model for processing at least second sensor data.

According to various, but not necessarily all, embodiments there is provided a non-transitory computer readable medium comprising computer program instructions for causing an apparatus to perform at least the following:

using a generative neural network trained to translate first sensor data to simulated second sensor data, to translate input first sensor data from a first sensor to simulated second sensor data; and providing the simulated second sensor data to a different, specific-task, machine-learning model for processing at least second sensor data.

According to various, but not necessarily all, embodiments there is provided an apparatus comprising means for: simulating, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and providing the simulated data to a different, specific-task, machine-learning model for processing at least data exhibiting characteristics indicative of being from the second sensor, not the first sensor.

According to various, but not necessarily all, embodiments there is provided a method of processing sensor data comprising:

simulating, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and providing the simulated data to a different, specific-task, machine-learning model for processing at least data exhibiting characteristics indicative of being from the second sensor, not the first sensor.

According to various, but not necessarily all, embodiments there is provided an apparatus comprising:

at least one processor; and at least one memory including computer program code, the at least one memory and the computer program code configured to, with the at least one processor, cause the apparatus at least to perform:

simulate, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and provide the simulated data to a different, specific-task, machine-learning model for processing at least data exhibiting characteristics indicative of being from the second sensor, not the first sensor.

According to various, but not necessarily all, embodiments there is provided an apparatus comprising first circuitry configured to.

simulate, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and second circuitry configured to receive the simulated data and run a different, specific-task, machine-learning model for processing at least data exhibiting characteristics indicative of being from the second sensor, not the first sensor.

According to various, but not necessarily all, embodiments there is provided a computer program that, when run on a computer, performs:

simulating, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and providing the simulated data to a different, specific-task, machine-learning model for processing at least data exhibiting characteristics indicative of being from the second sensor, not the first sensor.

According to various, but not necessarily all, embodiments there is provided a non-transitory computer readable medium comprising computer program instructions for causing an apparatus to perform at least the following:

simulating, using a generative neural network data exhibiting characteristics indicative of being from a second sensor, not a first sensor, from input data exhibiting characteristics indicative of being from a first sensor, not a second sensor, wherein the generative neural network is trained to translate data exhibiting characteristics indicative of being from the first sensor, not the second sensor, to data exhibiting characteristics indicative of being from the second sensor, not the first sensor; and providing the simulated data to a different, specific-task, machine-learning model for processing at least data exhibiting characteristics indicative of being from the second sensor, not the first sensor.

According to various, but not necessarily all, embodiments there is provided an apparatus comprising means for: using a generative neural network, trained to translate first data to simulated second data, to translate input first data to simulated second data; and providing the simulated second data to a different, specific-task, machine-learning model for processing at least second data.

Although the following paragraphs refer to the apparatus that comprises means, similar functions and similar functional features may also be present in the methods of processing sensor data, the apparatuses comprising at least one processor, the apparatuses comprising circuitry, the computer programs and the non-transitory computer readable mediums as described in the preceding paragraphs.

In some but not necessarily all examples, the first sensor data is first audio data from a first microphone or exhibiting characteristics indicative of being from a first microphone and the second sensor data is second audio data from a second, different microphone, or exhibiting characteristics indicative of being from a second, different microphone. In some but not necessarily all examples, the specific-task is audio processing to classify an audio event captured by the second microphone.

In some but not necessarily all examples, the apparatus comprises means for: providing the simulated second sensor data to the specific-task, machine-learning model to train the specific-task, machine-learning model to process the second sensor data, wherein the specific-task, machine-learning model, when trained, is configured to receive and process the second sensor data to perform a specific task.

In some but not necessarily all examples, the apparatus comprises means for:

providing examples of first sensor data to the specific-task, machine-learning model to train the specific-task, machine-learning model to process first sensor data, wherein the specific-task, machine-learning model, when trained, is configured to receive and process first sensor data to perform the specific task.

In some but not necessarily all examples, the apparatus comprises means for:

providing the simulated second sensor data to the specific-task, machine-learning model, wherein the specific-task, machine-learning model has been trained to receive and process second sensor data but not first sensor data. In some but not necessarily all examples, the specific-task, machine-learning model is configured to receive and process second sensor data in real time.

In some but not necessarily all examples, the generative neural network has been trained as a generative network in a conditional generative adversarial network comprising: at least one generative network that generates simulated second sensor data from input first sensor data; and at least one evaluative network that evaluates similarity between the simulated second sensor data and input second sensor data and provides a learning feedback to the at least one generative network.

In some but not necessarily all examples, the generative adversarial network is a cyclic generative adversarial network comprising: a first generative network that uses a first mapping that maps first sensor data to simulated second sensor data; a second generative network that uses a second mapping that maps second sensor data to simulated first sensor data; and an evaluative network that evaluates at least cycle consistency loss to enforce simulated first sensor data to be substantially similar to the first sensor data, the simulated first sensor data being produced by the second mapping from simulated second sensor data, produced by the first mapping from the first sensor data.

In some but not necessarily all examples, the evaluative network is configured to enforce simulated second sensor data to be substantially similar to the second sensor data, the simulated second sensor data being produced by the first mapping, from simulated first sensor data produced by the second mapping from the second sensor data.

In some but not necessarily all examples, the apparatus comprises means for dividing the first sensor data into a feature space that parameterizes the first sensor data using two or more parameters.

In some but not necessarily all examples, the feature space of the first data is a spectrogram.

In some but not necessarily all examples, the generative neural network is a convolutional neural network comprising: multiple hidden layers including one or more convolutional layers; one or more maximum pooling layers; and one or more non-linear activation layers.

In some but not necessarily all examples, the convolutional neural network is configured as a multi-layer encoder in combination with a multi-layer decoder.

In some but not necessarily all examples, the convolutional neural network comprises multiple skip connections between the multi-layer encoder and the multi-layer decoder.

In some but not necessarily all examples, the convolutional neural network is a symmetric fully convolutional neural network comprising a contracting path to capture context and a symmetric expanding path to enable localization.

According to various, but not necessarily all, embodiments there is provided examples as claimed in the appended claims.

In the preceding paragraphs, reference has been made to a 'specific-task, machine-learning model'. This may additionally or alternatively be a 'specific-task, neural network'.

BRIEF DESCRIPTION

Some example embodiments will now be described with reference to the accompanying drawings in which.

DETAILED DESCRIPTION

Figure 1A:
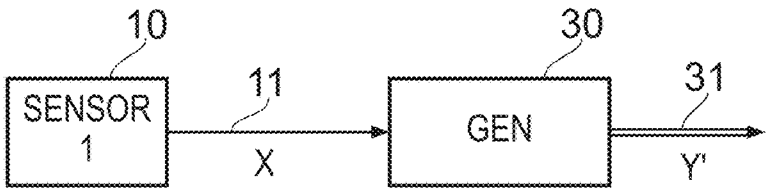
FIG. 1A, 1B, 1C show example embodiments of the subject matter described herein.

FIG. 1A illustrates an example of a generative neural network 30 that receives first data 11 from a first device 10, e.g. a first sensor 10, and produces simulated second data 31. The generative neural network 30 is trained to translate the first data 11 from the first device 10 to simulated second data 31. The simulated second data 31 is data as if from a second device, e.g. a second sensor.

Figure 1B:
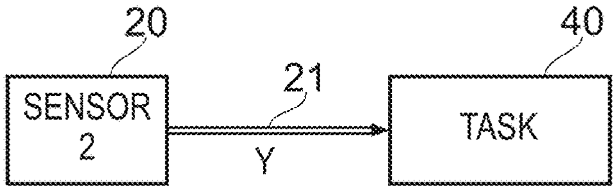

FIG. 1B illustrates a specific-task, machine-learning model 40. The specific-task, machine-learning model 40 receives and processes at least second data 21 from a second device 20, e.g. a second sensor 20.

Figure 1C:
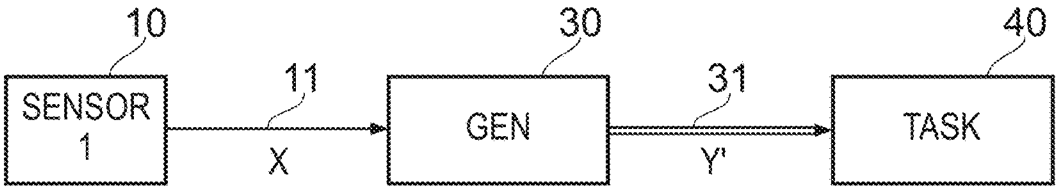

FIG. 1C illustrates a combination of the generative neural network 30 and the specific-task, machine-learning model 40. The generative neural network 30 is trained to translate first device data (e.g. first sensor data) to simulated second device data (e.g. simulated second sensor data). In the example illustrated, it translates input first device data 11 from a first device 10 (e.g. input first sensor data 11 from a first sensor 10) to simulated second device data 31 (e.g. to simulated second sensor data 31). The simulated second device data 31 (e.g. the simulated second sensor data 31) is provided to a different, specific-task, machine-learning model 40 that receives and processes the simulated second device data 31 (e.g. simulated second sensor data 31).

The input first device data 11 may be data from a first device 10 or may be data exhibiting characteristics indicative of being from the first device 10. The simulated second device data 31 is data exhibiting characteristics indicative of being from the second device 20. In a similar manner, the input first sensor data 11 may be data from a first sensor 10 or may be data exhibiting characteristics indicative of being from the first sensor 10. The simulated second sensor data 31 is data exhibiting characteristics indicative of being from the second sensor 20. For example, characteristics and features of the simulated second sensor data 31 match characteristics and features of second sensor data 21 produced by the second sensor 20.

Figure 2:
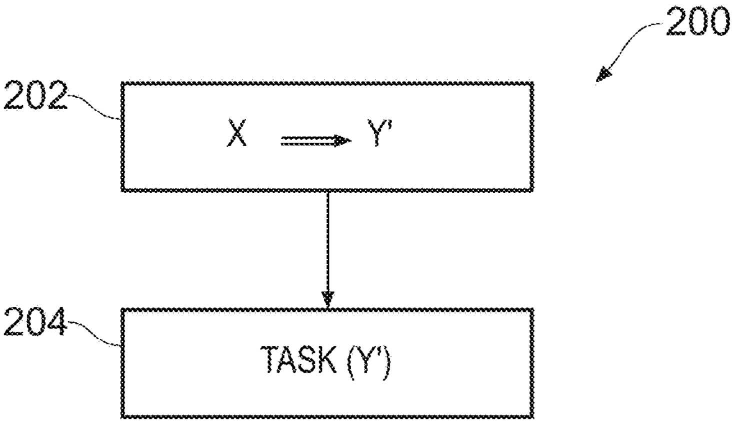
FIG. 2 shows another example embodiment of the subject matter described herein.

FIG. 2 illustrates an example of a method 200 of processing sensor data, or data from any device.

At block 202, the method 200 comprises using a generative neural network 30 trained to translate first sensor data to simulated second sensor data, to translate input first sensor data 11 from a first sensor 10 to simulated second sensor data 31. At block 204, the method 200 comprises providing the simulated second sensor data 31 to a different, specific-task, machine-learning model 40 for receiving and processing at least second sensor data. The specific-task, machine-learning model 40 receives and processes the simulated second sensor data 31.

In some examples, the generative neural network 30 and the first sensor 10 may be separated in space and the production of the input first sensor data 11 may be separated in time from the input of the input first sensor data 11 to the generative neural network 30. In some examples, the generative neural network 30 may be separated in space from the specific-task, machine-learning model 40. For example, the production of the simulated second sensor data 31 may be separated in time from the input of the simulated second sensor data 31 to the specific-task, machine-learning model 40.

A sensor's performance is characterized by a number of parameters such as frequency response, impedance rating, output level and even signal processing applied on the samples. Different sensors have different transfer functions owing to the variations in their underlying hardware and software processing pipelines. Sensor data transmission also suffers from a signal interference, e.g. in wireless communication. All these parameters contribute to a transfer function of the sensor and affect how an input at the sensor is converted to an output by the sensor.

The first sensor 10 and the second sensor 20 may be any suitable sensors. A sensor is designed to detects one or more sensor parameters that depend upon characteristics of an environment. The first sensor 10 and the second sensor 20 detect at least a common set of one or more sensor parameters. In some examples the first sensor 10 and the second sensor 20 may, for example, be microphones or other sensors such as inertial sensors (inertial measurement units IMU), image sensors, laser sensors, radar sensors, motion sensors, speed sensors, temperature sensors, pressure sensors, barometers, medical sensors such as heart rate sensors, blood pressure sensors, heart function sensors, blood glucose level sensors, arterial blood sensors or any combination thereof. In some examples the first and second sensors may be sensors that cannot sense images.

The specific-task performed by the specific-task, machine-learning model 40 is specific to the one or more sensor parameters detected by the second sensor 20. It may operate as a sensor data classifier.

The method illustrated in FIG. 2 may be used for the purposes of training the specific-task, machine-learning model 40 as described in more detail with reference to FIG. 4 below or it may be used at the inference stage to provide a simulated input to an already trained specific-task, machine-learning model 40 as described in more detail with reference to FIG. 5 below. An advantage of the method is that the machine-learning model may be used with a greater range of data sets.

Figure 3A:
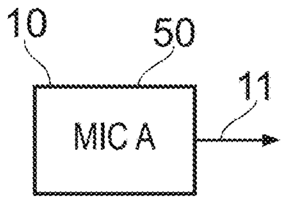
FIG. 3A, 3B show example embodiments of the subject matter described herein.
Figure 3B:
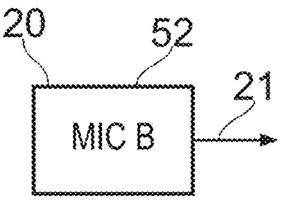

FIG. 3A illustrates an example of the first sensor 10, or a first device, and FIG. 3B illustrates an example of the second sensor 20, or a second device. The first sensor 10 illustrated in FIG. 3A is a first microphone 50 and the second sensor 20 illustrated in FIG. 3B is a second microphone 52. The first microphone 50 produces first audio data 11 and the second microphone 52 produces second audio data 21.

In this example, the first sensor data 11 is first audio data from a first microphone 50. However, in other examples the first sensor data may be first audio data exhibiting characteristics indicative of being from the first microphone 50.

In the example of FIG. 3B, the second sensor data 21 is second audio data from the second, different microphone 52. However, in other examples the second sensor data is second audio data exhibiting characteristics indicative of being from the second, different microphone 52.

The audio data may, for example, be audio samples or audio features, such as spectrograms.

Where audio data is used for sensor data, specific-task performed by the specific-task, machine-learning model may be audio processing to classify an audio event captured by a second microphone. For example, the specific-task, machine-learning model may be configured to infer eating activities, ambient conditions, subjective user states (e.g. emotion, stress), well-being, and productivity, and may also perform speech analysis (e.g. speech recognition, speaker identification, keyword spotting, command identification).

A microphone's performance is characterized by a number of parameters such as frequency response, impedance rating, output level and even the signal processing applied on the recorded audio before it is made available to the user applications. All these parameters contribute to the transfer function of a microphone and affect how an input audio signal is converted into its corresponding output by the microphone. Different microphones have different transfer functions, owing to the variations in their underlying hardware or any software processing pipelines. As such, for the same given audio input, variations in the outputs of different microphones are likely. The first sensor data will therefore have characteristics different to the second sensor data 21. As there is variability in the sensor data 11, 21, e.g. produced by different microphones, it would be desirable to be able to convert the first sensor data of a first sensor 10, e.g. a microphone 50 to second sensor data 21 of a second sensor 20, e.g. a microphone 52.

Figure 4:
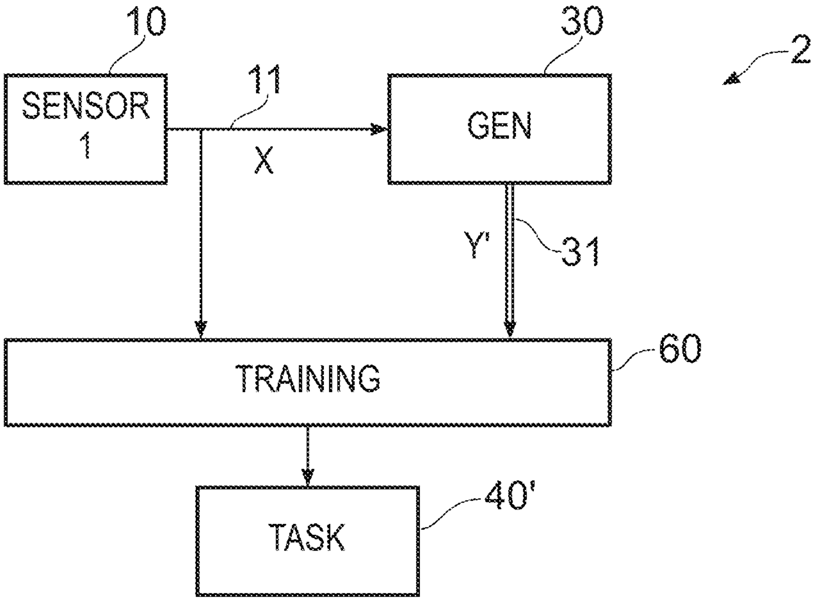
FIG. 4 shows another example embodiment of the subject matter described herein.

FIG. 4 schematically illustrates the operation of an apparatus 2 in which the simulated second sensor data 31 is used for training the specific-task, machine-learning model 40.

The apparatus 2 is configured to use a generative neural network 30 that has been trained to translate first sensor data to simulated second sensor data, to translate input first sensor data 11 from a first sensor 10 to simulated second sensor data 31 and is configured to provide the simulated second sensor data 31 to a different, specific-task, machine-learning model 40 for processing at least second sensor data.

The apparatus 2 provides the simulated second sensor data 31 to the specific-task, machine-learning model 40 to train 60 the specific-task, machine-learning model 40 to process the second sensor data 21. The specific-task, machine-learning model, when trained, is configured to receive and process the second sensor data 21 to perform a specific task.

In addition, in this example, the apparatus 2 is configured to provide examples of the first sensor data 11 to the specific-task, machine-learning model to train the specific-task, machine-learning model to process first sensor data 11. The specific-task, machine-learning model 40, when trained, is configured to receive and process the first sensor data 11 to perform the specific task.

The training process 60 therefore takes as inputs the input first sensor data 11 and also the simulated second sensor data 31 produced by the generative neural network 30 from the input first sensor data 11.

Figure 5:
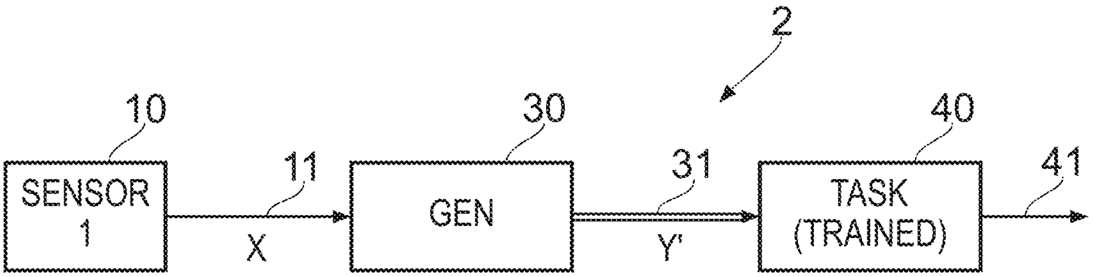
FIG. 5 shows an example embodiment of the subject matter described herein.

FIG. 5 illustrates an example in which an apparatus 2 uses the simulated second sensor data 31 in the performance of the specific task by the specific-task, machine-learning model 40. In this example, the specific-task, machine-learning model 40 has previously been trained, for example, to process second sensor data. The generative neural network 30 operates as a pre-processing module in an inference pipeline.

The apparatus 2 is configured to use a generative neural network 30 which has been trained to translate first sensor data to simulated second sensor data, to translate input first sensor data 11 from a first sensor 10 to simulated second sensor data 31 and is configured to provide the simulated second sensor data 31 to a different, specific-task, machine-learning model 40 for processing at least second sensor data.

The apparatus 2 is configured to provide the simulated second sensor data 31 to the specific-task, machine-learning model 40 where the specific-task, machine-learning model has previously been trained to receive and process second sensor data but not first sensor data.

In some, but not necessarily all, examples, the specific-task, machine-learning model 40 may be configured to receive and process second sensor data in real time. This allows the apparatus 2 to operate live, in real time and process the output of the first sensor 10 without delay. Each of the generative neural network 30 and the specific-task, machine-learning model 40 may be configured to process received data at a rate greater than the rate at which it is received.

Figure 6:
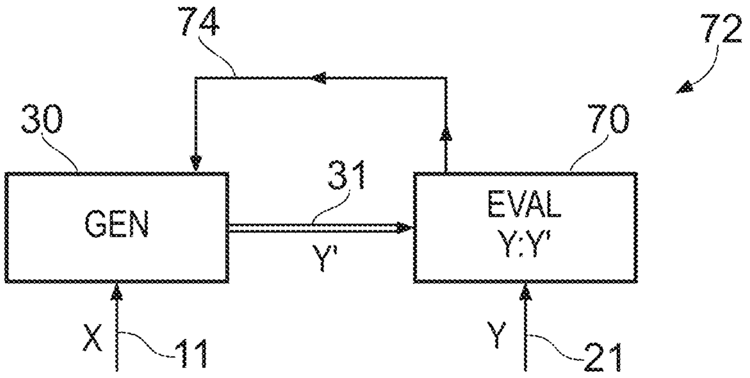
FIG. 6 shows another example embodiment of the subject matter described herein.

FIG. 6 schematically illustrates the training of the generative neural network 30. The training is unsupervised using unlabelled input.

The training of the generative neural network 30 occurs by training the generative neural network 30 as a generative network in a conditional generative adversarial network (GAN) 72. The conditional generative adversarial network 72 comprises at least one generative network 30 that generates simulated second sensor data 31 from input first sensor data 11 and at least one evaluative network 70 that evaluates similarity between the simulated second sensor data 31 and input second sensor data 21 and provides a learning feedback 74 to the at least one generative network 30.

The similarity may be evaluated at any suitable level of abstraction. It may be evaluated at the level of the sensor data as received, or at a level corresponding to pre-processing of the sensor data or even at a post-processing level, for example performance in relation to a task such as classification. The task may, for example, be the classification, or other task, performed by the specific-task machine-learning model 40.

The input data, the input first sensor data 11 and the input second sensor data 21 are unlabelled and unpaired and the training of the generative network 30 is unsupervised.

In the following, the first sensor data 11 is referenced using X and the second sensor data is referenced using Y. First order, simulated first sensor data 11 is referenced using X' (X'=F(Y)) and the first-order, second sensor data is referenced using Y' (Y'=G(X)). Second order, simulated first sensor data 11 is referenced using X" (X"=F(Y')=F(G(X))) and the first-order, second sensor data is referenced using Y' (Y"=G(X')=G(F(Y))). The first sensor data X is data from a first sensor or exhibiting characteristics indicative of being from a first sensor. The simulated first sensor data X', X" is first data exhibiting characteristics indicative of being from a first sensor. The second sensor data Y is data from a second sensor or exhibiting characteristics indicative of being from a second sensor. The simulated second sensor data Y', Y" is second data exhibiting characteristics indicative of being from a second sensor.

The generative neural network 30 is trained to learn a mapping G, such that Y'≈G(X). G generates realistic samples of the target domain Y from the source domain X.

The evaluative network 70 defines a discriminator $D_Y$ for distinguishing the generated samples Y'=G(X) that simulate the target domain from the real samples of the target domain Y.

The Generator 30 and Discriminator Dy play a game of trying to beat each other and in the process, both networks get better.

More formally the objective is to learn a mapping function (generator) G between two domains X and Y given training samples $\{x_i\}_{i=1}^{N}$ where $x_i \in X$ and $\{y\}_{j=1}^{M}$ and where $x_i \in Y$.

Adversarial loss matches the distribution of generated data to the data distribution in the target domain $D_Y$ distinguishes between data {y} and translated data y'=G(x)

For mapping G: X→Y and discriminator $D_Y$, G tries to generate data G(x) that is similar to data from domain Y. Adversarial discriminators $D_Y$ aims to distinguish between translated samples G(x) and real samples y.

The objective is set so that G aims to minimize it and D tries to maximize it, an example loss function is $L(G, D_Y, X, Y)=\log[D_Y(y)]+\log[1-D_Y(G(x))]$. The objective is $\min_G \max_{\_DY}$ (L). Alternative loss functions are possible.

Thus the generative adversarial network 72 learns a mapping G: X→Y such that the distribution of data from G(X) is indistinguishable from the distribution Y using adversarial loss.

Figure 7:
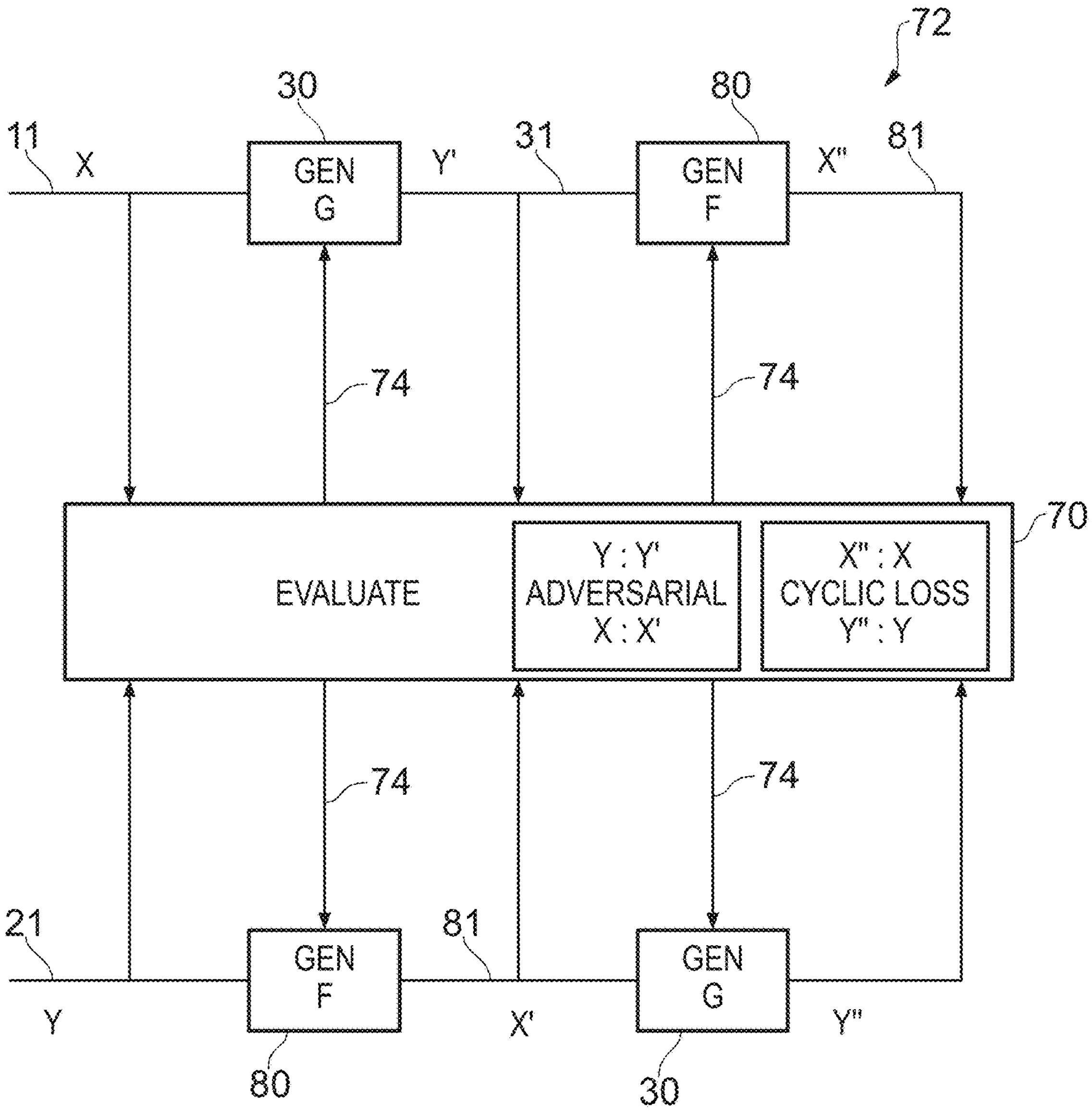
FIG. 7 shows an example embodiment of the subject matter described herein.

As illustrated in FIG. 7, in some, but not necessarily all, examples, the generative adversarial network 72 is a cyclic generative adversarial network. This example of the cyclic generative adversarial network 72 comprises a first generative network 30 that uses a first mapping G that maps first sensor data 11 (X) to simulated second sensor data 31 (Y'); a second generative network 80 that uses a second mapping F that maps simulated second sensor data 31 (Y') to simulated first sensor data 81 (X"); and an evaluative network 70 that evaluates at least cyclic consistency loss to enforce simulated first sensor data 81 (X") to be substantially similar to the first sensor data 11 (X). The simulated first sensor data 81 (X") is produced by the second mapping F from simulated second sensor data 31 (Y'), produced by the first mapping G from the first sensor data 11 (X). This part of the cyclic generative adversarial network 72 enforces forward cyclic consistency from first sensor data 11 to simulated second sensor data 31 (Y') via the mapping G, to simulated first sensor data 81 (X") via the mapping F.

In some, but not necessarily all, examples, it may also be desirable to enforce reverse cyclic consistency. The reverse cycle is the consistency between the second sensor data 21(Y) and simulated second sensor data Y" where the simulated second sensor data is produced by the mapping G from simulated first sensor data X' and the simulated first sensor data X' is produced by the mapping F from the second sensor data Y.

The evaluative network 70 is configured to enforce simulated second sensor data (Y") to be substantially similar to the second sensor data (Y). The simulated second sensor data (Y") being produced by the first mapping G, from simulated first sensor data X' produced by the second mapping F from the second sensor data Y. This is illustrated in the lower half of FIG. 7.

It will be appreciated that the evaluative network 70 performs adversarial optimization via feedback signals 74 using forward and/or reverse cyclic consistency as a constraint.

Two deep generator networks may be used to define the mapping G and the mapping F respectively. The mapping F generates realistic samples X'=F(Y) of the first domain X from the first domain X The mapping G generates realistic samples Y'=G(X) of the second domain Y from a second domain Y. Two deep discriminator networks $D_X$, $D_Y$: distinguish the generated samples of the target domain from the real samples of the target domain $D_X$ distinguishes between data {x} and translated data F(y). $D_Y$ distinguishes between data {y} and translated data G(x) The Generators and Discriminators play a game of trying to beat each other and in the process, both networks get better. Adversarial loss matches the distribution of generated data to the data distribution in the target domain For mapping G: X→Y and discriminator $D_Y$, G tries to generate data G(x) that is similar to data from domain Y. $D_Y$ aims to distinguish between translated samples G(x) and real samples y. The objective is set so that G aims to minimize it and D tries to maximize it, an example loss function is $L(G, D_Y, X, Y)=\log[D_Y(y)]+\log[1-D_Y(G(x))]$, where the objective is $\min_G \max_{DY}$ (L). Alternative loss functions are possible.

For mapping F: Y→X and discriminator $D_X$, F tries to generate data F(y) that is similar to data from domain X. $D_X$ aims to distinguish between translated samples F(y) and real samples x. The objective is set so that G aims to minimize it and D tries to maximize it, an example loss function is L(F, $D_X$, Y, X)=log[$D_X$(x)]+log[1−$D_X$(F(y))], where the objective is $\min_F \max_{DX}$ (L). Alternative loss functions are possible.

The system simultaneously learns a mapping G: X→Y such that the distribution of data from G(X) is indistinguishable from the distribution Y, and learns a mapping F: Y→X such that the distribution of data from F(Y) is indistinguishable from the distribution X and enforces cycle consistency such that F(G(X))~X, using adversarial loss. Optionally it also enforces cycle consistency such that G(F(Y))~Y Minimizing cycle consistency losses prevent the learned mappings G and F from contradicting each other Forward cycle consistency requires that, for each data x from domain X, the translation cycle should be able to bring x back to its original version x→G(x)→F(G(x))=x.

Backward cycle consistency requires that, for each data y from domain Y, the translation cycle should be able to bring y back to its original version y→F(y)→G(F(y))=y.

It is therefore possible to create a create a cycle consistency loss function $L_{cyc}$ e.g. $L_{cyc}$=||F(G(x))−x||+||G(F(y))−y||

The full objective for adversarial loss and cycle consistency is $\min_{G,\ F} \max_{DX}$, $D_Y$ (L), where L=L(G, $D_Y$, X, Y)+L(F, $D_X$, Y, X)+λ$L_{cyc}$. λ is a control parameter When the first and second sensors are different microphones, the mapping G translates first sensor data 11 (from the first microphone) to second sensor data 31 (as if from the second microphone). The second sensor data 31 preserves the linguistic content of the audio, but introduces the unique characteristics of the second microphone.

In the example of FIG. 7, a small amount of unlabeled audios data is taken from the first and second microphones. The audio data need not be paired or time aligned or have the same linguistic content.

The cyclic GAN is trained to learn a forward mapping G and the inverse mapping F. In effect, the two generators learn the differences in how the two microphones pick up different audio frequencies. The generators then try to use this information to translate audio data from one microphone domain to another.

Figure 8:
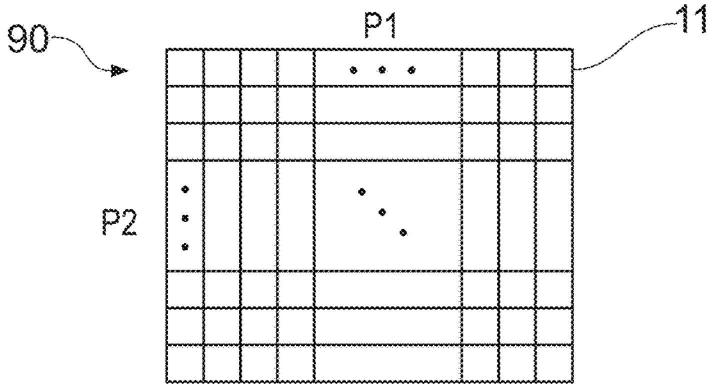
FIG. 8 shows another example embodiment of the subject matter described herein.

FIG. 8 illustrates an example of first sensor data 11. It may also represent second sensor data 21. In this example, the apparatus 2 has divided the first sensor data 21 into a feature space 90 that parameterises the first sensor data using two or more parameters p1, p2. In some, but not necessarily all, examples, the feature space 90 of the first data 11 is a spectrograph where the first parameter p1 is time and the second parameter p2 is frequency. The first sensor data 11 is consequently divided into discreet frequency-time tiles.

The parameterisation is chosen so that the local features in the parameter space are more related than distal features in the parameter space.

Figures 9A, 9B, 9C, 9D:
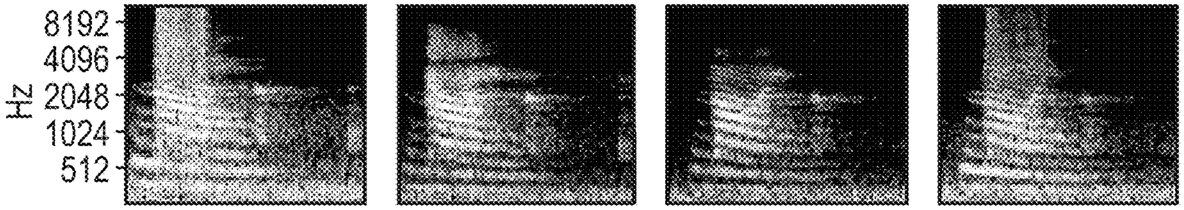
FIG. 9A, 9B, 9C, 9D show example embodiments of the subject matter described herein.

FIG. 9A illustrates an example of the first sensor signal 11 (X) as a spectrogram.

FIG. 9B illustrates an example of the simulated second sensor signal 11 (Y'=G(X)) from the GAN 72. FIG. 9C illustrates an example of the second sensor signal 12 (Y) as a spectrogram. FIG. 9D illustrates an example of the simulated first sensor signal 12 (X'=F(Y)) as a spectrogram.

Figure 10:
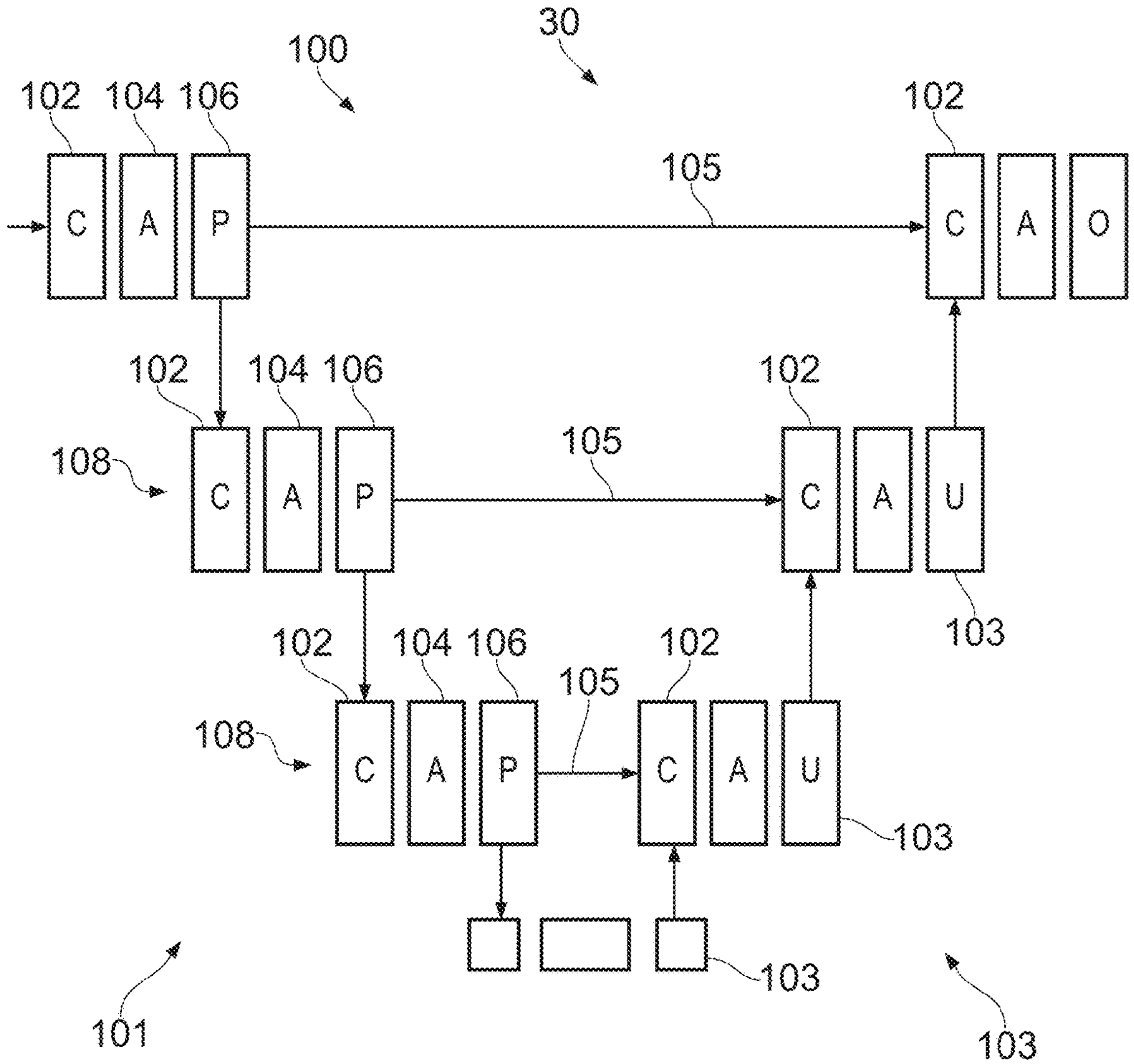
FIG. 10 shows another example embodiment of the subject matter described herein.

FIG. 10 illustrates an example of the generative neural network 30. In this example, but not necessarily all examples, the generative neural network is a convolutional neural network comprising multiple hidden layers 108 including one or more convolutional layers 102, one or more maximum pooling layers 106 and one or more non-linear activation layers 104.

In some, but not necessarily all, examples, the convolutional neural network 30 is configured as a multi-layer encoder in combination with a multi-layer decoder. Such a convolutional neural network may comprise multiple skip connections 105 between the multiple layers 108 of the encoder 101 and the multiple layers 108 of the decoder 103. In the example illustrated, the convolutional neural network is a symmetric fully convolutional neural network comprising a contracting path 101 to capture context and a symmetric expanding path 103 to enable localization.

Considering FIG. 10 in more detail, the convolutional neural network for the generator 30 has deep stacking of multiple hidden layers including one or more convolutional layers 102 (C), one or more maximum pooling layers 106 (P) and one or more non-linear activation layers 104 (A). A final fully connected layer (O) is used for weighted voting.

A convolution layer 106 applies a convolution filter that assesses how well a feature defined by the filter is represented at that position, for all or most positions.

A max pooling layer 106 applies a window of size 2×2 or 3×3, and moves with stride 2. It determines the max value in the window and applies pooling. Pooling shrinks the data set and makes result less sensitive to exact position.

A non-liner activation layer applies a non-linear activation e.g. a rectified linear units layer.

The network is trained using the loss function. Back propagation is applied to learn weights and filters.

The fully convolutional network 30 has a multi-layer encoder 101 and multi-layer decoder 103 architecture for segmentation (feature classification and localization).

Encoder 101 reduces a spatial dimension with pooling layers 106 and captures semantic/contextual information and a decoder 103 recovers the object details and spatial information. There are usually shortcut connections (skip connections) 105 from encoder layers 108 to decoder layers 108 to help the decoder recover the object details lost by pooling.

A skip connection 105 is a connection that bypasses at least one layer 108. It is used to transfer local information by concatenating or summing feature maps from the encoder layers with feature maps from the decoder layers.

The network 30 has a contracting/encoding path 101, a bottleneck and an expanding/decoding path 103.

The network is a symmetric fully convolution network for data augmentation comprising a contracting path 101 to capture context and a symmetric expanding path 103 to enable localization. The contracting path and the expanding path have the same number of levels.

The contracting/encoding path 101 has multiple (N) of:

(i) M groups of: convolution layer 102 and non-linear activation layer 104 (with batch normalization);

(ii) max pool layer 106

A bottleneck joins the contracting/encoding path 101 to an expanding/decoding path 103 comprising convolutional layers (with batch normalization), with dropout.

The expanding/decoding path has multiple (N) of:

up-sampling layer 103 (U), concatenation with of feature map from the up-sampling layer with a corresponding cropped feature map from the contracting/encoding path provided via a skip connection 105, M groups of: convolution layer 102 (C) and non-linear activation layer 104 (A) (with batch normalization).

The up-sampling may, for example, comprise nearest neighbours re-sampling or transposed convolution (fractionally strided convolution).

Data from non-linear activation layers (A) in the contracting path 101 provide data 105 that are combined with corresponding data from an up-sampling layer (U) of the expanding path 103 to produce an input for a convolutional layer (C) in the expanding path 103.

Feature maps from each level of the contracting path 101 are passed over to the analogous level in the expanding path 103 via skip connections 105.

Figure 11A:
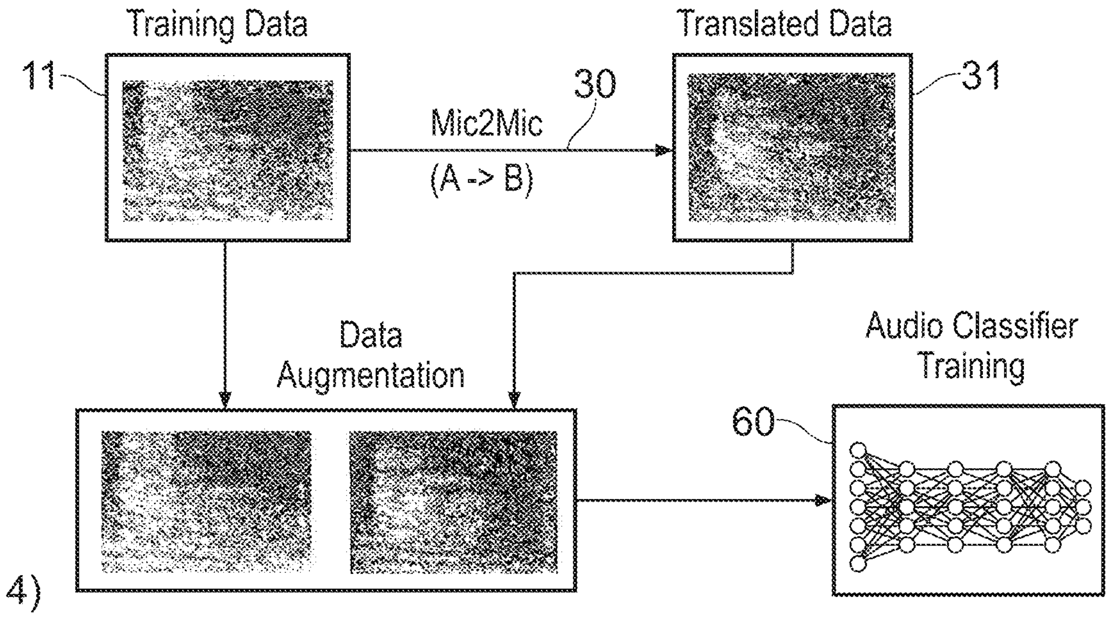
FIG. 11A, 11B shows example embodiments of the subject matter described herein.

FIG. 11A illustrates an example similar to that already presented in relation to FIG. 4. In this example, the first sensor data 11 is training data from a first microphone. The generative neural network 30 translates the first sensor data 11 from microphone A to simulated second sensor data 31. The simulated second sensor data exhibits characteristics indicative of being from a second microphone 52 different to the first microphone 50. Both the first sensor data 11 and the simulated second sensor data 31 are used in the training 60 of the specific-task, machine-learning model.

It should be appreciated that the audio content of the first sensor data 11 and the simulated second sensor data 31 is the same however the first sensor data exhibits characteristics indicative of being from the first microphone 50 and the second sensor data 31 exhibits characteristics indicative of being from the second microphone 52.

As the specific-task, machine-learning model is now able to learn a classification task from a more diverse set of microphones, it generalises much better to unknown microphones.

Figure 11B:
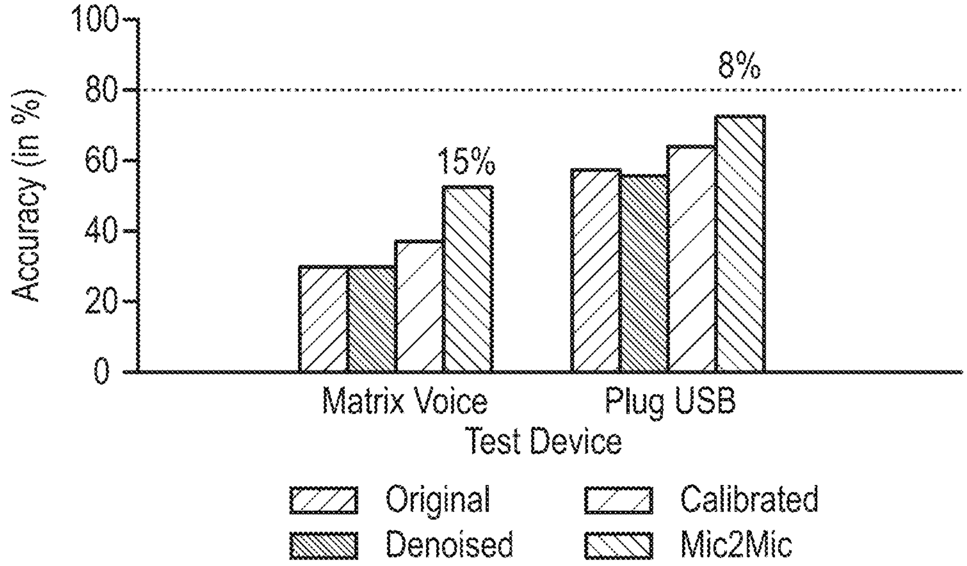

FIG. 11B illustrates accuracy improvements when the specific-task, machine-learning model is an audio keyword detection task. When the generative neural network 30 is used to produce simulated sensor data for augmenting training data, the accuracy of the keyword detection increases up to 15% over baselines. The baselines include state of the art microphone calibration, and audio denoising techniques.

Figure 12A:
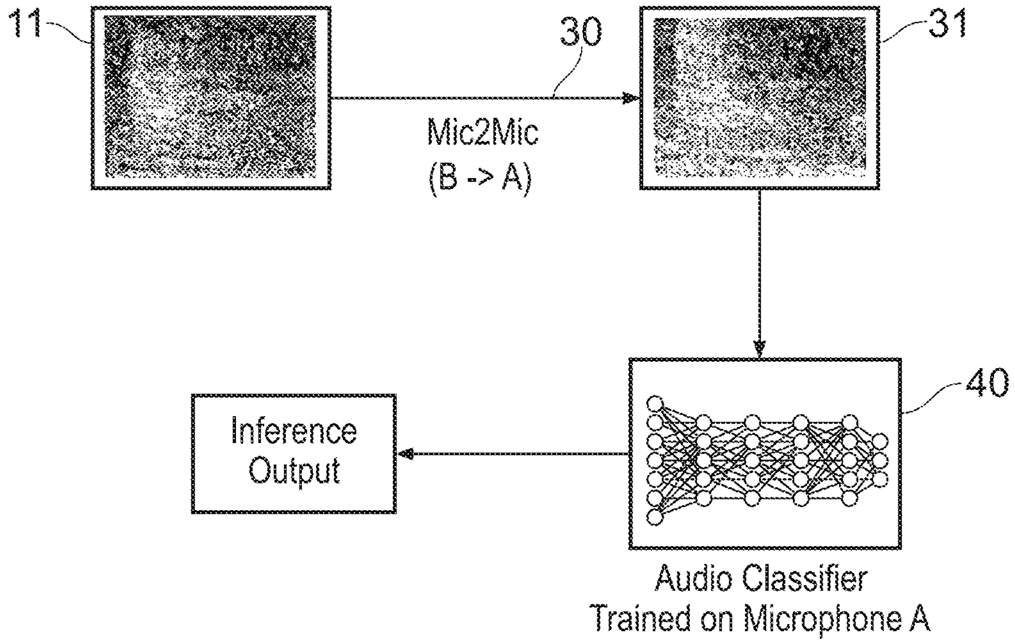
FIG. 12A, 12B show example embodiments of the subject matter described herein.

FIG. 12A illustrates a use of a generative neural network 30 to translate first sensor data 11 to simulated second sensor data 31 at inference time. The simulated second sensor data 31 is provided as an inference input to the already trained specific-task, machine-learning model 40. This example is similar to the example previously illustrated and discussed in reference to FIG. 5. However, in this example the first sensor data 11 is data from a first microphone 50 and exhibits characteristics indicative of being from the first microphone 50. The simulated second sensor data 31 exhibits characteristics indicative of being from a second microphone 52. However, the audio content of the first sensor data 11 and the simulated second sensor data 31 is the same.

The specific-task, machine-learning model has previously been trained using the second sensor data 21. The process therefore allows for a specific-task, machine-learning model 40 that has been trained using one type of data to be used with different data by translating that different data to data that has characteristics of the original training data.

Figure 12B:
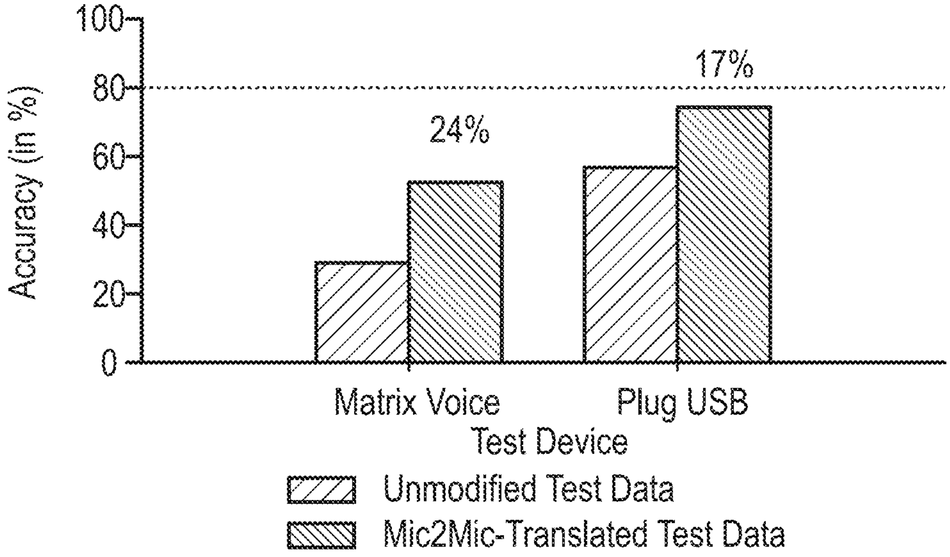

FIG. 12B illustrates the accuracy improvements achieved by the process illustrated in FIG. 12A. In this example the specific-task, machine-learning model is an audio keyword detection model. By using the generative neural network 30 at the inference stage to translate the test data, the accuracy of the inferences increases by up to 24% over the baseline test.

It will be appreciated that the implementation of this method introduces a new component to the inference pipeline. The new component is the generative neural network 30 that translates the first sensor data 11 to the simulated second sensor data 31.

In this example, a user device having a first sensor 10, for example a first microphone, monitors the environment, functions or movements of the user device and generates first sensor data 11. In this example, the first sensor data 11 is transmitted to circuitry and/or one or more processors, that operate the generative neural network 30. The operation of the generative neural network 30 may occur at the user device or at a different apparatus, for example a server or computer on a network.

The generative neural network 30 translates the first sensor data 11 to simulated second sensor data 31 that matches the characteristics and features of data from a second sensor 20, such as a second microphone 52.

The simulated second sensor data 31 is transmitted to circuitry and/or one or more processors, that operate the specific-task, machine-learning model 40. The operation of the specific-task, machine-learning model 40 may occur at the user device or at a different apparatus, for example a server or computer on a network. The operation of the specific-task, machine-learning model 40 may occur at the same or a different apparatus to the operation of the generative neural network 30.

In this example, the specific-task, machine-learning model 40 is a sensor data classifier (e.g. an audio classifier) that has been trained to analyse second sensor data.

The specific-task, machine-learning model 40 analyses the simulated second sensor data 31 and provides an inference output or classification result based on the simulated second sensor data 31.

This system could analyse sensor data from two or more sensors in the user device simultaneously in a single generative neural network 30 and/or a single specific-task, machine-learning model 40. Alternatively each sensor could have a separate generative neural network 30.

This system could analyse device data, for example electrical signals from one or more different devices in the user device. The generative neural network 30 may be used to translate first device data, from a device in the user device, to simulated second device data where the simulated second device data has a form that matches the characteristics and features of second device data.

This system could analyse device data, for example electrical signals from the user device. The generative neural network 30 may be used to translate first device data, from the user device, to simulated second device data where the simulated second device data has a form that matches the characteristics and features of second device data.

Figure 13A:
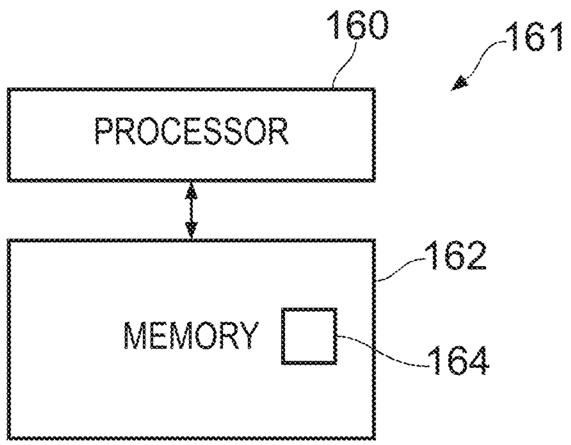
FIG. 13A, 13B show example embodiments of the subject matter described herein.

FIG. 13A illustrates an example of a controller 161. Implementation of a controller 161 may be as controller circuitry. The controller 161 may be implemented in hardware alone, have certain aspects in software including firmware alone or can be a combination of hardware and software (including firmware).

As illustrated in FIG. 13A the controller 161 may be implemented using instructions that enable hardware functionality, for example, by using executable instructions of a computer program 164 in a general-purpose or special-purpose processor 160 that may be stored on a computer readable storage medium (disk, memory etc) to be executed by such a processor 160.

The processor 160 is configured to read from and write to the memory 162. The processor 160 may also comprise an output interface via which data and/or commands are output by the processor 160 and an input interface via which data and/or commands are input to the processor 160.

The memory 162 stores a computer program 164 comprising computer program instructions (computer program code) that controls the operation of the apparatus 2 when loaded into the processor 160. The computer program instructions, of the computer program 164, provide the logic and routines that enables the apparatus 1 to perform the methods illustrated in FIGS. 1 to 12. The processor 160 by reading the memory 162 is able to load and execute the computer program 164.

The apparatus 2 therefore comprises:

at least one processor 160; and at least one memory 162 including computer program code the at least one memory 162 and the computer program code configured to, with the at least one processor 160, cause the apparatus 2 at least to perform:

using a generative neural network trained to translate first sensor data to simulated second sensor data, to translate input first sensor data from a first sensor to simulated second sensor data;

providing the simulated second sensor data to a different, specific-task, machine-learning model for receiving and processing at least second sensor data.

Figure 13B:
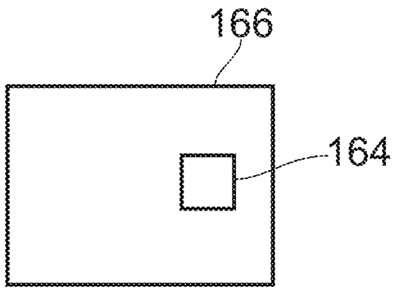

As illustrated in FIG. 13B, the computer program 164 may arrive at the apparatus 2 via any suitable delivery mechanism 164. The delivery mechanism 164 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 164. The delivery mechanism may be a signal configured to reliably transfer the computer program 164. The apparatus 2 may propagate or transmit the computer program 164 as a computer data signal.

Computer program instructions for causing an apparatus to perform at least the following or for performing at least the following:

using a generative neural network trained to translate first sensor data to simulated second sensor data, to translate input first sensor data from a first sensor to simulated second sensor data; and providing the simulated second sensor data to a different, specific-task, machine-learning model for receiving and processing at least second sensor data.

The computer program instructions may be comprised in a computer program, a non-transitory computer readable medium, a computer program product, a machine readable medium. In some but not necessarily all examples, the computer program instructions may be distributed over more than one computer program.

Although the memory 162 is illustrated as a single component/circuitry it may be implemented as one or more separate components/circuitry some or all of which may be integrated/removable and/or may provide permanent/semi-permanent/dynamic/cached storage.

Although the processor 160 is illustrated as a single component/circuitry it may be implemented as one or more separate components/circuitry some or all of which may be integrated/removable. The processor 160 may be a single core or multi-core processor.

Figure 14:
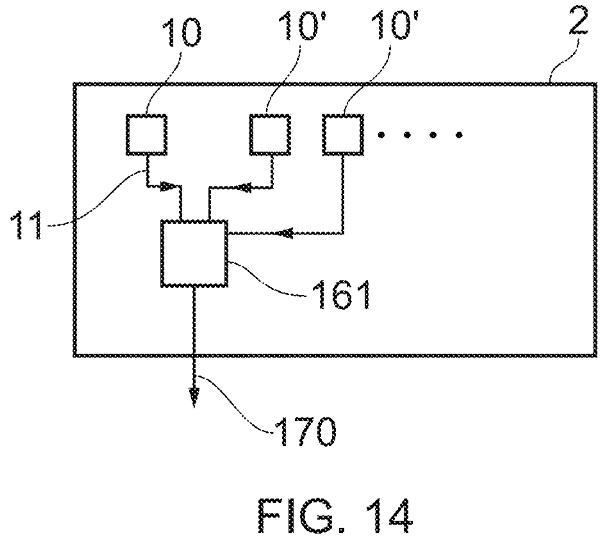
FIG. 14 show example embodiments of the subject matter described herein

FIG. 14 illustrates an example of an apparatus 2 comprising the controller 161 or some other alternative processing circuitry for performing the operation of the generative neural network 30.

The apparatus 2 additionally comprises the first sensor 10, which may for example be a first microphone 50.

In some but not necessarily all examples, the apparatus 2 comprises additional one or more sensors 10' for producing sensor data or devices or circuitry for producing device data.

In this example, the apparatus 2 is a user device. It may for example be a hand portable personal electronic device that is sized to fit within a jacket pocket or handbag.

The apparatus 2, in this example, uses the first sensor 10 (and optionally one or more additional sensors) to monitors the environment local to the apparatus 2, functions of the apparatus 2 or movements of the user or the apparatus 2.

The first sensor generates first sensor data 11. The first sensor data 11 is transmitted to circuitry and/or one or more processors 161 that operate the generative neural network 30. The operation of the generative neural network 30 may occur at the user apparatus 2 or at a different remote apparatus, for example a server or computer on a network.

In this example, operation of the generative neural network 30 is controlled by the controller 161.

The generative neural network 30 translates the first sensor data 11 to simulated second sensor data 31 that matches the characteristics and features of data from a second sensor 20, such as a second microphone 52.

The simulated second sensor data 31 is transmitted to circuitry and/or one or more processors, that operate the specific-task, machine-learning model 40. The operation of the specific-task, machine-learning model 40 may occur at the user apparatus 2.

The operation of the specific-task, machine-learning model 40 may occur at the same circuitry or controller 161 as the operation of the generative neural network 30 or at different circuitry or controller.

In other examples, operation of the specific-task, machine-learning model 40 may occur at a remote apparatus, for example a server or computer on a network.

In this example, the specific-task, machine-learning model 40 is a sensor data classifier (e.g. an audio classifier) that has been trained to analyse second sensor data.

The specific-task, machine-learning model 40 analyses the simulated second sensor data 31 and provides as an output 170 an inference output or classification result based on the simulated second sensor data 31. In some but not necessarily all examples, this output from the specific-task, machine-learning model 40 automatically controls an operation at the apparatus 2. The operation may, for example, be an input command to the apparatus 2 or a security command to the apparatus 2.

The apparatus 2, in some examples, processes sensor data from two or more sensors in the user device simultaneously in a single generative neural network 30 and/or a single specific-task, machine-learning model 40. Alternatively, each sensor could have a separate generative neural network 30.

This system could analyse device data in addition or alternatively to sensor data.

For example, electrical signals from one or more different devices in the apparatus 2 are analysed. The generative neural network 30 may be used to translate first device data, from a device in the apparatus 2, to simulated second device data where the simulated second device data has a form that matches the characteristics and features of second device data.

For example, electrical signals from the apparatus 2 are analysed. The generative neural network 30 may be used to translate first device data, from the apparatus 2, to simulated second device data where the simulated second device data has a form that matches the characteristics and features of second device data.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 to 12 may represent steps in a method and/or sections of code in the computer program 164. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

In some but not necessarily all examples, the apparatus 2 is configured to communicate data from the apparatus 2 with or without local storage of the data in a memory 162 at the apparatus 2 and with or without local processing of the data by circuitry or processors at the apparatus 2.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The generative neural network 30 and the task-specific, machine-learning model 40 may be operations that are performed by the same circuitry or by different circuitry. When performed by different circuitry they may be performed in the same apparatus or in different apparatus.

The communication of sensor data 11 to the generative neural network 30, the communication of simulated sensor data 31 from the generative neural network 30, the communication of simulated sensor data 31 to the task-specific, machine-learning model 40 and communications from the task-specific, machine-learning model 40 may be made by any suitable means. The communication may, for example, be over short range communication connection (such as Bluetooth, UWB (Ultra Wide Band), infrared, WiBree), a wireless local area network (WLAN), and/or a wireless data network or a cellular communications network (e.g. 2G, 3G, 4G, LTE, 5G), and/or wireless data communication IoT technology (e.g. LTE-M, NB-IoT, LoRaWAN). The communication may, for example, additionally or alternatively use physical connections or wired network communication. Various communication protocols such as Internet Protocol (IP, Transmission Control protocol (TCP), Simple Mail Transfer Protocol (STMP) among others may be used.

The apparatus 2 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 2 where it may produce an output sensible to the subject such as an audio output, visual output or haptic output.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects the processing of audio data for recognition (e.g. voice, keyword), security, compression, error control etc Make sure application (use cases) are included as claim features (and preambles).

Include the latest hardware, have layers of complexity as claim features.

In the forgoing examples, the generative neural network 30 has been described as receiving and translating the first sensor data 11. It may also be trained to receive and translate sensor data from other, different sensors.

In the forgoing examples, the task-specific, machine-learning model 40 has been described as receiving simulated second sensor data 31 (FIG. 4, 5), and additionally depending upon the examples, first sensor data 11 (FIG. 4). There may be additional task-specific, machine-learning models for different tasks, for different sensor data or for different sensor parameters. The task-specific, machine-learning model 40 can, in some but not necessarily all examples, be trained for different tasks, for different sensor data or for different sensor parameters.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:

at least one processor; and at least one memory including computer program code, the at least one memory and the computer program code configured to, with the at least one processor, cause the apparatus at least to perform:

receive input comprising 1) a first audio sensor data from a first sensor of a first device and 2) a second audio sensor data from a second sensor of a target second device, wherein the first sensor of the first device and the second sensor of the target second device comprise different audio transfer functions;

use a generative neural network to translate the first audio sensor data to a simulated second audio sensor data matching a format of an audio sensor data generated by an audio transfer function of the target second device, wherein the generative neural network is configured to: 1) map the first audio sensor data to the simulated second audio sensor data using a first mapping; 2) map the simulated second audio sensor data to a simulated first audio sensor data using a second mapping; and 3) evaluate at least cycle consistency loss to enforce the simulated first audio sensor data to be substantially similar to the first audio sensor data; and provide the simulated second audio sensor data to a different, specific-task, machine-learning model for processing at least the simulated second audio sensor data.

2. An apparatus as claimed in claim 1, wherein the first audio sensor data is from a first microphone or exhibiting characteristics indicative of being from a first microphone and the second audio sensor data is from a second, different microphone, or exhibiting characteristics indicative of being from a second, different microphone.

3. An apparatus as claimed in claim 1, further configured to provide the simulated second audio sensor data to the specific-task, machine-learning model to train the specific-task, machine-learning model to process the second audio sensor data, wherein the specific-task, machine-learning model, when trained, is configured to receive and process the simulated second audio sensor data to perform a specific task.

4. An apparatus as claimed in claim 3, further configured to provide examples of the first audio sensor data to the specific-task, machine-learning model to train the specific-task, machine-learning model to process the first audio sensor data, wherein the specific-task, machine-learning model, when trained, is configured to receive and process the first audio sensor data to perform the specific task.

5. An apparatus as claimed in claim 1, further configured to provide the simulated second audio sensor data to the specific-task, machine-learning model, wherein the specific-task, machine-learning model has been trained to receive and process the second audio sensor data but not the first sensor data.

6. An apparatus as claimed in claim 1, wherein the generative neural network has been trained as a generative network in a conditional generative adversarial network comprising: at least one generative network that generates the simulated second audio sensor data from the first audio sensor data; and at least one evaluative network that evaluates similarity between the simulated second audio sensor data and the second audio sensor data and provides a learning feedback to the at least one generative network.

7. An apparatus as claimed in claim 6, wherein the at least one evaluative network is configured to enforce the simulated second audio sensor data to be substantially similar to the second audio sensor data, the simulated second audio sensor data being produced by the first mapping, from simulated first audio sensor data produced by the second mapping from the second audio sensor data.

8. An apparatus as claimed in claim 1, further configured to divide the first audio sensor data into a feature space that parameterizes the first audio sensor data using two or more parameters.

9. An apparatus as claimed in claim 8, wherein the feature space of the first data is a spectrogram.

10. An apparatus as claimed in claim 1, wherein the generative neural network is a convolutional neural network comprising: multiple hidden layers including one or more convolutional layers; one or more maximum pooling layers; and one or more non-linear activation layers.

11. An apparatus as claimed in claim 10, wherein the convolutional neural network is configured as a multi-layer encoder in combination with a multi-layer decoder and/or wherein the convolutional neural network comprises multiple skip connections between the multi-layer encoder and the multi-layer decoder.

12. An apparatus as claimed in claim 11, wherein the convolutional neural network is a symmetric fully convolutional neural network comprising a contracting path to capture context and a symmetric expanding path to enable localization.

13. A method comprising:

receiving input comprising 1) a first audio sensor data from a first sensor of a first device and 2) a second audio sensor data from a second sensor of a target second device, wherein the first sensor of the first device and the second sensor of the target second device comprise different audio transfer functions;

using a generative neural network to translate the first audio sensor data to a simulated second audio sensor data matching a format of an audio sensor data generated by an audio transfer function of the target second device, wherein the generative neural network is configured to: 1) map the first audio sensor data to the simulated second audio sensor data using a first mapping; 2) map the simulated second audio sensor data to a simulated first audio sensor data using a second mapping; and 3) evaluate at least cycle consistency loss to enforce the simulated first audio sensor data to be substantially similar to the first audio sensor data; and providing the simulated second audio sensor data to a different, specific-task, machine-learning model for processing at least the simulated second audio sensor data.

14. A method as claimed in claim 13, wherein the first audio sensor data is from a first microphone or exhibiting characteristics indicative of being from a first microphone and the second audio sensor data is from a second, different microphone, or exhibiting characteristics indicative of being from a second, different microphone.

15. A method as claimed in claim 13, further comprising: providing the simulated second audio sensor data to the specific-task, machine-learning model to train the specific-task, machine-learning model to process the second audio sensor data, wherein the specific-task, machine-learning model, when trained, is configured to receive and process the simulated second audio sensor data to perform a specific task.

16. A method as claimed in claim 13, further comprising: providing the simulated second audio sensor data to the specific-task, machine-learning model, wherein the specific-task, machine-learning model has been trained to receive and process the second audio sensor data but not the first audio sensor data.

17. A method as claimed in claim 13, wherein the generative neural network has been trained as a generative network in a conditional generative adversarial network comprising: at least one generative network generating the simulated second audio sensor data from the first audio sensor data; and at least one evaluative network evaluating similarity between the simulated second audio sensor data and the second audio sensor data and providing a learning feedback to the at least one generative network.

18. A method as claimed in claim 13, further comprising: dividing the first audio sensor data into a feature space that parameterizes the first audio sensor data using two or more parameters.

19. A non-transitory computer readable medium comprising computer program instructions for causing an apparatus to perform at least the following:

receive input comprising 1) a first audio sensor data from a first sensor of a first device and 2) a second audio sensor data from a second sensor of a target second device, wherein the first sensor of the first device and the second sensor of the target second device comprise different audio transfer functions;

use a generative neural network to translate the first audio sensor data to a simulated second audio sensor data matching a format of an audio sensor data generated by an audio transfer function of the target second device, wherein the generative neural network is configured to: 1) map the first audio sensor data to the simulated second audio sensor data using a first mapping; 2) map the simulated second audio sensor data to a simulated first audio sensor data using a second mapping; and 3) evaluate at least cycle consistency loss to enforce the simulated first audio sensor data to be substantially similar to the first audio sensor data; and provide the simulated second audio sensor data to a different, specific-task, machine-learning model for processing at least the simulated second audio sensor data.

* * * * *